(12) United States Patent
Minouchi

(10) Patent No.: US 9,920,184 B2
(45) Date of Patent: Mar. 20, 2018

(54) PRODUCTION METHOD FOR RUBBER COMPOSITION

(71) Applicant: TOYO TIRE & RUBBER CO., LTD., Osaka-shi, Osaka (JP)

(72) Inventor: Norio Minouchi, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 84 days.

(21) Appl. No.: 15/035,158

(22) PCT Filed: May 7, 2014

(86) PCT No.: PCT/JP2014/062268
§ 371 (c)(1),
(2) Date: May 6, 2016

(87) PCT Pub. No.: WO2015/068415
PCT Pub. Date: May 14, 2015

(65) Prior Publication Data
US 2016/0289421 A1    Oct. 6, 2016

(30) Foreign Application Priority Data
Nov. 8, 2013  (JP) ................................. 2013-232138

(51) Int. Cl.
*C08J 3/22* (2006.01)
*C08K 5/24* (2006.01)
*C08K 3/04* (2006.01)
*C08L 21/00* (2006.01)
*C08J 3/20* (2006.01)

(52) U.S. Cl.
CPC ................ *C08K 5/24* (2013.01); *C08J 3/203* (2013.01); *C08J 3/226* (2013.01); *C08K 3/04* (2013.01); *C08L 21/00* (2013.01)

(58) Field of Classification Search
CPC .... C08K 5/04; C08K 5/24; C08J 3/203; C08J 3/22; C08J 3/226
USPC ....................................................... 523/351
See application file for complete search history.

(56) References Cited

U.S. PATENT DOCUMENTS

| | | |
|---|---|---|
| 5,534,569 A | 7/1996 | Etoh |
| 8,053,496 B1 | 11/2011 | Minouchi et al. |
| 2013/0289165 A1 | 10/2013 | De Landtsheer et al. |
| 2015/0031795 A1 | 1/2015 | Ihara |
| 2015/0051338 A1* | 2/2015 | Koyama ................... C08K 3/04 524/572 |
| 2015/0247011 A1* | 9/2015 | Nomura ................... B29B 13/06 524/526 |

FOREIGN PATENT DOCUMENTS

| | | |
|---|---|---|
| DE | 10 2014 110 591 A1 | 1/2015 |
| JP | 4-136048 A | 5/1992 |
| JP | 7-57828 B2 | 6/1995 |
| JP | 2001-172435 A | 6/2001 |
| JP | 2010-65126 A | 3/2010 |
| JP | 2010-270200 A | 12/2010 |
| JP | 4738551 B1 | 8/2011 |
| JP | 2013-144761 A | 7/2013 |
| JP | 2014-5381 A | 1/2014 |
| WO | 2012/084821 A1 | 6/2012 |

OTHER PUBLICATIONS

Office Action dated Mar. 14, 2017, issued in counterpart German Application No. 11 2014 005 088.1, with English tanslation. (7 pages).
Notification of Transmittal of Translation of the International Preliminary Report on Patentability (Form PCT/IB/338) of International Patent Application No. PCT/JP2014/062268 dated May 19, 2016, with Forms PCT/IB/373 and PCT/ISA/237. (5 pages).
International Search Report dated Jul. 29, 2014, issued in counterpart International Application No. PCT/JP2014/062268 (2 pages).

* cited by examiner

*Primary Examiner* — Edward J Cain
(74) *Attorney, Agent, or Firm* — Westerman, Hattori, Daniels & Adrian

(57) ABSTRACT

A production method for a rubber composition, comprising: using an internal mixer to mix/disperse a rubber wet masterbatch containing a carbon black, a hydrazide compound, an antiaging agent, and sulfur, wherein a timing when the hydrazide compound is charged into the internal mixer is not the same timing when the antiaging agent is charged thereinto but the same timing when the component sulfur is charged thereinto.

4 Claims, No Drawings

US 9,920,184 B2

PRODUCTION METHOD FOR RUBBER COMPOSITION

TECHNICAL FIELD

The present invention relates to a production method for a rubber composition. This rubber composition is useful as a raw material for a vulcanized rubber excellent in tear-resistant performance and low exothermic performance.

BACKGROUND ART

It has been hitherto known in the rubber industry that when a rubber composition containing a filler, such as carbon black, is produced, a rubber wet masterbatch is used to improve the workability of the composition and the dispersibility of the filler. This situation is a situation of mixing the filler and a dispersing solvent beforehand with each other at a predetermined ratio therebetween, dispersing the filler into the dispersing solvent by a mechanical force to yield a filler-containing slurry solution, mixing this slurry solution with a rubber latex solution in a liquid phase, adding a solidifier such as an acid into the mixture to solidify the mixture, and collecting and drying the solidified mixture. In the case of using the rubber wet masterbatch, a rubber composition is obtained which is better in filler dispersibility therein and rubber properties such as workability and reinforceability than in the case of using any dry masterbatch obtained by mixing a filler and a rubber with each other in a solid phase. The use of such a rubber composition as a raw material makes it possible to produce, for example, a pneumatic tire and other rubber products that have a decreased rolling resistance and an excellent fatigue resistance.

In the meantime, it is indispensable for a vulcanized rubber used for tires to be improved in tear-resistance performance and others from the viewpoint of being improved in durability. For this purpose, it is necessary to heighten an interaction between carbon black, which is a reinforcing filler, and the rubber to heighten the dispersibility of carbon black in the rubber.

As a technique for heightening the dispersibility of a reinforcing filler in a rubber composition, Patent Document 1 listed below describes a technique of blending a hydrazide compound and a reinforcing filler into a raw rubber composition.

Patent Document 2 listed below describes a method for producing a master-batch containing a rubber component, a filler and a rubber chemical, in which a first kneader is used to knead the rubber component and the filler and then a second kneader is used to blend the rubber chemical further into the resultant masterbatch.

Patent Document 3 listed below describes a technique of charging 0.1 to 5 parts by mass of a hydrazide compound and 0.2 to 5 parts by mass of zinc flower simultaneously into 100 parts by mass of a rubber component made of at least one from natural rubbers and diene based synthetic rubbers in a rubber mixing and kneading step before the charging of a vulcanizing agent thereinto, and further attaining the mixing and kneading in the state of setting a highest temperature of the system into 130 to 170° C.

Patent Document 4 listed below describes a technique of blending 20 to 150 parts by mass of a filler and 0.05 to 20 parts by mass of a hydrazide compound into 100 parts by mass of at least one rubber selected from the group consisting of natural rubbers and diene based synthetic rubbers.

PRIOR ART DOCUMENTS

Patent Documents

Patent Document 1: JP-B-07-57828
Patent Document 2: JP-A-2010-65126
Patent Document 3: JP-A-2001-172435
Patent Document 4: JP-A-04-136048

SUMMARY OF THE INVENTION

Problems to be Solved by the Invention

However, the inventors have made eager investigations to find out that the above-mentioned precedent techniques have problems described hereinafter. Specifically, according to the technique described in Patent Document 1, the resultant rubber composition tends to be deteriorated in workability, and the dispersibility of a reinforcing filler therein is not sufficiently improved. According to the technique described in Patent Document 2, which includes a description of blending a hydrazide compound, the hydrazide compound and an antiaging agent are simultaneously charged, so that the resultant tends to be deteriorated in filler dispersibility therein. Furthermore, in the techniques described in Patent Documents 3 and 4, the blend of a specific hydrazide compound has a technical significance. Thus, these documents neither describe nor suggest what stage the hydrazide compound should be blended in light of a relationship with an antiaging agent.

In light of the above-mentioned actual situation, the present invention has been made, and an object thereof is to provide a production method for a rubber composition that makes it possible to improve the resultant vulcanized rubber in tear-resistant performance and low exothermic performance. Moreover, the invention relates to pneumatic fires obtained using the rubber composition.

Means for Solving the Problems

In order to solve the above-mentioned problems, the present invention has the following subject matter: the present invention relates to a production method for a rubber composition, comprising: using an internal mixer to mix/disperse a rubber wet masterbatch containing a carbon black, a hydrazide compound, an antiaging agent, and sulfur, wherein a timing when the hydrazide compound is charged into the internal mixer is not the same timing when the antiaging agent is charged thereinto but the same timing when the component sulfur is charged thereinto.

In this rubber composition production method, at the time of kneading the rubber wet masterbatch containing the carbon black in the internal mixer, a diene based rubber in the rubber wet masterbatch produces polymer radicals. When the hydrazide compound is present, in this stage, the hydrazide compound reacts with the diene based rubber by effect of the polymer radicals, and further reacts with the carbon black. In other words, the hydrazide compound is used as a mediation to produce bonds efficiently between the polymer in the diene based rubber and the carbon black, so that the carbon black becomes very good in dispersibility. Thus, the resultant vulcanized rubber can be improved in low exothermic performance.

However, when polymer radicals generated in a diene based rubber in any rubber wet masterbatch react with a hydrazide compound, the presence of an antiaging agent causes the polymer radicals generated in the diene based rubber to react competitively with the hydrazide compound and the antiaging agent. According to this reaction, the hydrazide compound does not sufficiently react with the diene based rubber not to form bonds sufficiently between the polymer in the diene based rubber and any carbon black. As a result, the carbon black is deteriorated in dispersibility, so that the resultant vulcanized rubber is not improved in low exothermic performance. However, in the present invention, in order to improve the dispersibility of the carbon black in the rubber composition, a timing when the hydrazide compound is charged into the internal mixer is not the same timing when the antiaging agent is charged thereinto but the same timing when the component sulfur is charged thereinto. In this way, in the invention, the dispersibility of the carbon black in the rubber composition is improved so that the resultant vulcanized rubber is improved in tear-resistant performance and low exothermic performance.

In the rubber composition production method, it is preferred that: the rubber wet masterbatch is obtained through a step ($\alpha$) of using, as raw materials, at least the carbon black, a dispersing solvent, and a rubber latex solution to disperse at least the carbon black into the dispersing solvent to produce a carbon-black-containing slurry solution, a step ($\beta$) of mixing the carbon-black-containing slurry solution with the rubber latex solution to produce a carbon-black-containing rubber latex solution, and a step ($\gamma$) of solidifying/drying the carbon-black-containing rubber latex solution; and the step ($\alpha$) is a step ($\alpha$-(a)) in which when the carbon black is dispersed into the dispersing solvent, at least one portion of the rubber latex solution is added thereto, thereby producing a slurry solution containing the carbon black to which rubber latex particles adhere, and the step ($\beta$) is a step ($\beta$-(a)) of mixing the slurry solution containing the carbon black, to which the rubber latex particles adhere, with the rest of the rubber latex solution to produce a rubber latex solution containing the carbon black to which rubber latex particles adhere.

According to this production method, at the time of dispersing the carbon black into the dispersing solvent, at least one portion of the rubber latex solution is added thereto, thereby producing a slurry solution containing the carbon black to which rubber latex particles adhere (the step ($\alpha$-(a))). In this way, a very thin latex phase is produced on a partial or entire region of the surface of the carbon black; thus, at the time of mixing the slurry solution with the rest of the rubber latex solution in the step ($\beta$-($\alpha$)), the re-aggregation of the carbon black can be prevented. As a result, a rubber wet masterbatch can be produced in which the carbon black is evenly dispersed and the dispersion stability of the carbon black is excellent over time. In this wet masterbatch, the carbon black is evenly dispersed, and further the dispersing agent is also restrained from re-aggregating over time; thus, a vulcanized rubber obtained by using, as a raw material, the rubber composition containing this masterbatch is remarkably improved in tear-resistant performance and low exothermic performance.

In the production method, the dispersibility of the carbon black in the slurry solution is better than in the case of dispersing a carbon black merely into a dispersing solvent to produce a slurry solution, and further the re-aggregation of the carbon black can be prevented. Accordingly, the production method also produces an advantageous effect of giving an excellent storage stability to the slurry solution.

The rubber composition production method preferably includes a step (I) of kneading at least the rubber wet masterbatch and the antiaging agent to be mixed with each other, and subsequently discharging the resultant mixture, which contains the rubber wet masterbatch and the antiaging agent, from the internal mixer; a step (II) of kneading the mixture again in the internal mixer to fracture a re-aggregate of the carbon black in the mixture; and a step (III) of charging, after the step (II), the hydrazide compound and the component sulfur simultaneously into the internal mixer to knead the mixture, the hydrazide compound and the component sulfur, thereby mixing these materials with each other.

This production method has the step (I) of kneading at least the rubber wet masterbatch and the antiaging agent to be mixed with each other, and subsequently discharging the resultant mixture, which contains the rubber wet masterbatch and the antiaging agent, from the internal mixer. Through the step (I), the dispersibility of the carbon black in the rubber composition is heightened, so that in the step (III) performed afterwards, the hydrazide compound can be caused to react evenly with the entire surface of the carbon black. In this production method, in order to keep the rubber temperature as low as possible at the time of blending the hydrazide compound into the rubber composition, in the step (I) the mixture containing at least the rubber wet masterbatch and the antiaging agent is once discharged from the internal mixer. In this case, as the discharged rubber composition is cooled to a further degree, the carbon black tends to re-aggregate more largely in the rubber composition. Accordingly, even when the hydrazide compound is blended into the rubber composition in this bad-dispersible state of the carbon black, the advantageous effect of the carbon-black-dispersibility-improvement, which results from the blending of the hydrazide compound into the rubber composition, is not obtained.

However, in the production method, after the step (I) the mixture is again kneaded in the internal mixer to fracture a re-aggregate of the carbon black in the mixture (the step (II)), and after the step (II) the hydrazide compound and the component, sulfur are charged into the internal mixer to knead the mixture and the hydrazide compound, thereby mixing these materials with each other (the step (III)). Through this process, the re-aggregate of the carbon black in the rubber composition is fractured so that the carbon black can be caused to react with the hydrazide compound in the state of being heightened in dispersibility. Consequently, also when a vulcanized rubber is finally obtained therefrom, the dispersibility of the carbon black can be heightened. As a result, in the vulcanized rubber of the rubber composition obtained by the production method, the dispersibility of the carbon black is improved and further this vulcanized rubber is improved in tear-resistant performance and low exothermic performance. Furthermore, because of the improvement in the dispersibility of the carbon black in the rubber composition, the rubber composition can be restrained from rising in viscosity. As a result, in the production method having the above-mentioned requirements, the workability of the rubber composition is improved.

In the rubber composition production method, it is preferred that: in the step (II), the period for the kneading is at least 15 seconds or more, and a stirring rotor of the internal mixer shows a rotational speed of 35 rpm or more; and in the step (III), the period for the kneading is at least 40 seconds or more, and the stirring rotor of the internal mixer shows a rotational speed of 15 to 25 rpm or more. According to this subject matter, while the carbon black can be restrained from re-aggregating in the rubber composition, a reaction time between the hydrazide compound and the carbon black can be kept sufficiently long. Accordingly, the dispersibility of the carbon black in the rubber composition is made even higher, so that the vulcanized rubber can be improved, particularly, in tear-resistant performance and low exothermic performance.

The present invention also relates to: a rubber composition obtained by the production method recited in any one of the above-mentioned paragraphs concerned; and a pneumatic tire including a ply topping rubber, a tread cap rubber and/or a tread base rubber which is/are obtained using this rubber composition. A vulcanized rubber obtained by using this rubber composition as a raw material is excellent in tear-resistant performance and low exothermic performance. Accordingly, the pneumatic tire having, as its robber region(s), this vulcanized rubber is very much improved in fuel efficiency and/or durability.

MODE FOR CARRYING OUT THE INVENTION

The production method according to the present invention for a rubber composition makes use of an internal mixer to mix/disperse a rubber wet masterbatch containing a carbon black, a hydrazide compound, an antiaging agent, and sulfur.

The rubber composition production method according to the present invention is performed, using an internal mixer. This internal mixer may be, for example, a claw-engaging-type Bunbury mixer, a tangential-line-type Bunbury mixer, or a kneader, and is in particular preferably a claw-engaging-type Bunbury mixer.

Hereinafter, a description will be made about the rubber wet masterbatch, which is used as a raw material in the present invention and contains the carbon black. This carbon-black-containing rubber wet masterbatch is obtained using at least a filler, a dispersing solvent and a rubber latex solution as raw materials.

The carbon black may be any carbon black that is usable in an ordinary rubber industry, such as SAF, ISAF, HAF, FEF or GPF, and may also be any elect reconductive carbon black, such as acetylene black or ketjen black. The carbon black may be a granulated carbon black, which is a carbon black granulated in an ordinary rubber industry under consideration of the handleability thereof, or a non-granulated carbon black.

When two or more carbon blacks are used in the present invention, the carbon blacks are preferably two or more carbon blacks different from each other in nitrogen adsorption specific surface area since the resultant vulcanized rubber is improved in tear-resistant performance. More specifically, it is preferred to use carbon black A having a nitrogen adsorption specific surface area ($N_2SA$-(A)) of 130 $m^2/g$ or less and carbon black B having a lower $N_2SA$-(B) than the $N_2SA$-(A) by 20 $m^2/g$ or more.

Carbon black A may be any carbon black as far as the carbon black has a nitrogen adsorption specific surface area ($N_2SA$) of 130 $m^2/g$ or less. Examples thereof include N220 ($N_2SA$: 119 $m^2/g$), N234 ($N_2SA$: 126 $m^2/g$), N330 ($N_2SA$: 79 $m^2/g$), N339 ($N_2SA$: 93 $m^2/g$), N550 ($N_2SA$: 42 $m^2/g$), and N774 ($N_2SA$: 27 $m^2/g$) each prescribed in ASTM D1765. In the meantime, carbon black B may be any carbon black as far as the carbon black has a higher $N_2SA$-(B) than the $N_2SA$-(A) by 25 $m^2/g$ or more. Carbon black B may be selected at will from the above-mentioned carbon black examples as far as this relationship is satisfied.

In order to heighten the low exothermic performance of the vulcanized rubber effectively, the blend amount of carbon black A is preferably from 7 to 68 parts by mass, more preferably from 12 to 48 parts by mass for 100 parts by mass of the rubber component. In order to heighten the tear-resistant performance of the vulcanized rubber effectively, the blend amount of carbon black B is preferably from 8 to 78 parts by mass, more preferably from 12 to 58 parts by mass for 100 parts by mass of the rubber component.

About the total content of the carbon black(s) in the rubber wet masterbatch, the carbon black(s) is/are blended in an amount preferably from 20 to 80 parts by mass, more preferably from 30 to 60 parts by mass for 100 parts by mass of the diene based rubber.

The dispersing solvent is in particular preferably water, and may be, for example, water containing an organic solvent.

As the rubber latex solution, a natural rubber latex solution and a synthetic rubber latex solution are usable.

The natural rubber latex solution is a natural product based on metabolic effect of a plant, and is in particular preferably a natural-rubber/water system latex solution, in which a dispersing solvent is water. About the natural rubber latex solution, concentrated latex, and fresh latex called field latex are usable without being distinguished from each other. The synthetic rubber latex solution may be, for example, a latex solution of styrene-butadiene rubber, butadiene rubber, nitrile rubber or chloroprene rubber produced by emulsion polymerization.

Hereinafter, a description will be made about a method for producing the carbon-black-containing rubber wet masterbatch. This production method has a step (α) of dispersing the carbon black into the dispersing solvent to produce a carbon-black-containing slurry solution, a step (β) of mixing the carbon-black-containing slurry solution with the rubber latex solution to produce a carbon-black-containing rubber latex solution, and a step (γ) of solidifying/drying the carbon-black-containing rubber latex solution.

It is particularly preferred in the present invention that the step (α) is a step (α-(a)) in which when the carbon black is dispersed into the dispersing solvent, at least one portion of the rubber latex solution is added thereto, thereby producing a slurry solution containing the carbon black to which rubber latex particles adhere, and the step (β) is a step ((β-(a)) of mixing the slurry solution containing the carbon black, to which the rubber latex particles adhere, with the rest of the rubber latex solution to produce a rubber latex solution containing the carbon black to which rubber latex particles adhere. Hereinafter, the step (α-(a)) and the step (β-(a)) will be described.

(1) Step (α-(a))

In the step (α-(a)), when the carbon black is dispersed into the dispersing solvent, at least one portion of the rubber latex solution is added thereto, thereby producing a slurry solution containing the carbon black to which rubber latex particles adhere. It is allowable to mix the rubber latex solution beforehand with the dispersing solvent, and subsequently add the carbon black thereto to be dispersed therein. It is also allowable to add the carbon black to the dispersing solvent, and next add the rubber latex solution thereto at a predetermined adding-speed and simultaneously disperse the carbon black in the dispersing solvent, or allowable to add the carbon black to the dispersing solvent, and next add a predetermined volume of the rubber latex solution several times through operations separated from each other and simultaneously disperse the carbon black in the dispersing solvent. By dispersing the carbon black into the dispersing solvent in the presence of the rubber latex solution, a slurry solution can be produced which contains the carbon black to which rubber latex particles adhere. The addition amount of the rubber latex solution in the step (α-(a)) is, for example, from 0.075 to 12% by mass of the total amount of the rubber latex solution to be used (the total amount of the solution to be added in the step (α-(a)) and the step (β-(a)).

In the step (α-(a)), the solid (rubber) content in the rubber latex solution to be added is preferably from 0.25 to 15%, more preferably from 0.5 to 6% by mass of the carbon black. The concentration of the solid (rubber) in the rubber latex solution to be added is preferably from 0.2 to 5% by mass, more preferably from 0.25 to 1.5% by mass. In these cases, a rubber wet masterbatch can be produced in which the dispersion degree of the carbon black is heightened while the carbon black is surely caused to adhere to the carbon black.

In the step (α-(a)), the method for mixing the carbon black and the dispersing solvent with each other in the presence of the rubber latex solution is, for example, a method of dispersing the carbon black, using an ordinary dispersing machine such as a highly shearing mixer, a High Shear Mixer, a homo-mixer, a ball mill, a bead mill, a high-pressure homogenizer, an ultrasonic homogenizer or a colloid mill.

The "highly shearing mixer" means a mixer having a high-speed-rotatable rotor and a fixed stator in which in the state of making a precise clearance between the rotor and the stator, the rotor is rotated to act a highly shearing effect. In order to produce such a highly shearing effect, it is preferred to set the clearance between the rotor and the stator to 0.8 mm or less, and set the circumferential speed of the rotor to 5 m/s or more. Such a highly shearing mixer may be a commercially available product. An example thereof is a mixer, "High Shear Mixer", manufactured by a company, Silverson.

At the time of mixing the carbon black with the dispersing solvent in the presence of the rubber latex solution, thereby producing the slurry solution containing the carbon black, to which rubber latex particles adhere, a surfactant may be added thereto in order to improve the carbon black in dispersibility. The surfactant may be a surfactant known in the rubber industry. Examples thereof include nonionic surfactants, anionic surfactants, cationic surfactants, and amphoteric surfactants. Instead of the surfactant or in addition of the surfactant, an alcohol such as ethanol may be used. However, when the surfactant is used, it is feared that the finally obtained vulcanized rubber is lowered in rubber physical properties. Thus, the blend amount of the surfactant is preferably 2 parts or less by mass, more preferably 1 part or less by mass for 100 parts by mass of the solid (rubber) content in the rubber latex solution. It is preferred not to use any surfactant substantially.

(2) Step (β-(a))

In the step (β-(a)), the slurry solution is mixed with the rest of the rubber latex solution to produce a rubber latex solution containing the carbon black to which rubber latex particles adhere. The method for mixing the slurry solution with the rest of the rubber latex solution is not particularly limited, and may be a method of mixing the slurry solution with the rest of the rubber latex solution, using an ordinary dispersing machine such as a highly shearing mixer, a High Shear Mixer, a homo-mixer, a ball mill, a bead mill, a high-pressure homogenizer, an ultrasonic homogenizer or a colloid mill. As required, the whole of the dispersing machine or some other mixing system may be heated at the time of the mixing.

When the drying period and labor in the step (γ) are considered, it is preferred that the rest of the rubber latex solution is higher in solid (rubber) concentration than the rubber latex solution added in the step (α-(a)). Specifically, the solid (rubber) concentration is preferably from 10 to 60% by mass, more preferably from 20 to 30% by mass.

(3) Step (γ)

In the step (γ), the carbon-black-containing rubber latex solution is solidified. The method for the solidification may be a method of adding a solidifier to the carbon-black-containing rubber latex solution, in which the rubber latex particles adhere to the carbon black, to yield a solidified product.

The solidifier may be a substance used ordinarily to solidify a rubber latex solution, for example, an acid such as formic acid or sulfuric acid, or a salt such as sodium chloride.

In the rubber composition production method according to the present invention, beside the carbon-black-containing rubber wet masterbatch, a hydrazide compound, an antiaging agent and sulfur are used as raw materials.

The hydrazide compound is a compound having, in the molecule thereof, one or more hydrazide groups (—CONHNH$_2$). Examples thereof include dihydrazide isophthalate, dihydrazide terephthalate, dihydrazide azelate, dihydrazide adipate, dihydrazide succinate, dihydrazide eicosandioate, 7,11-octadecadiene-1,18-dicarbohydrazide, hydrazide salicylate, hydrazide 4-methylbenzoate, and hydrazide 3-hydroxy-N'-(1,3-dimethylbutylidene)-2-naphthoate. In the present invention, the use of dihydrazide compounds, out of these examples, is preferred, and that of dihydrazide isophthalate is more preferred.

In the rubber composition production method according to the present invention, the hydrazide compound is blended in an amount preferably from 0.2 to 4.0 parts by mass, more preferably from 0.2 to 1 part by mass for 100 parts by mass of the diene based rubber.

The antiaging agent may be an antiaging agent usable usually for rubbers, examples thereof including aromatic amine type, amine-ketone type, monophenolic type, bisphenolic type, polyphenolic type, dithiocarbamic acid salt type, and thiourea type antiaging agents. These may be used singly or in the form of an appropriate mixture. The content of the antiaging agent(s) is preferably from 0.5 to 4.0 parts by mass, more preferably from 1 to 3 parts by mass for 100 parts by mass of the rubber component.

The component sulfur may be any ordinary sulfur species for rubbers. Examples thereof include powdery sulfur, precipitated sulfur, insoluble sulfur, and highly dispersed sulfur. In the case of considering physical properties and durability of the rubber after the composition is vulcanized, and others, the blend amount of the component sulfur is preferably from 0.7 to 5 parts by mass, more preferably from 1 to 3 parts by mass for 100 parts by mass of the rubber component, this amount being an amount in terms of sulfur.

In the present invention, besides the carbon black, an inorganic filler such as silica may be together used as a filler. When the inorganic filler is together used, the content of the carbon black and the inorganic filler is preferably from 35 to 80 parts by mass for 100 parts by mass of the diene based rubber.

The rubber composition production method of the present invention is characterized in that a timing when the hydrazide compound is charged into the internal mixer is not the same timing when the antiaging agent is charged thereinto but the same timing when sulfur is charged thereinto. This characteristic makes it possible to produce a rubber composition capable of improving a vulcanized rubber obtained therefrom in tear-resistant performance and low exothermic performance.

It is particularly preferred that the rubber composition production method of the present invention initially has a step (I) of kneading at least the rubber wet masterbatch and the antiaging agent to be mixed with each other, and subsequently discharging the resultant mixture, which contains the rubber wet masterbatch and the antiaging agent, from the internal mixer. When a claw-engaging-type Bunbury mixer is used as the internal mixer, in the step (I) the kneading period is preferably set into the range of 100 to 600 seconds and the rotational speed of its stirring rotor is preferably set into that of 30 to 60 rpm. The kneading temperature is preferably set to 170° C. or lower.

Preferably, the production method of the present invention next has a step (II) of kneading the mixture, which contains at least the rubber wet masterbatch and the antiaging agent, again in the internal mixer to fracture a re-aggregate of the carbon black in the mixture. When a claw-engaging-type Bunbury mixer is used as the internal mixer, in the step (II) the kneading period is preferably set to 15 seconds or more and the rotational speed of its stirring rotor is preferably set to 35 rpm or more. The upper limit of the kneading period and that of the rotational speed of the stirring rotor are not particularly limited. From the viewpoint of the productivity of the rubber composition and the prevention of rubber scorch, the former and latter limits are 130 seconds or less, and 100 rpm or less, respectively. The kneading temperature is preferably set to 120° C. or lower.

Preferably, after the step (II), the production method of the present invention further has a step (III) of charging the hydrazide compound and sulfur simultaneously into the internal mixer to knead the mixture containing the rubber wet masterbatch and the antiaging agent, the hydrazide compound and sulfur, thereby mixing these materials with each other. When a claw-engaging-type Bunbury mixer is used as the internal mixer, the kneading period is preferably set to 40 seconds or more and the rotational speed of its stirring rotor is preferably set into the range of 15 to 25 rpm. The upper limit of the kneading period is not particularly limited. From the viewpoint of the productivity and the prevention of rubber scorch, the limit is preferably 500 seconds or less. The kneading temperature is preferably set to 120° C. or lower.

In the present invention, it is preferred to perform the step (III) while a PID control is made. Specifically, about a motor for rotating a pair of stirring rotors located in a kneading chamber of the internal mixer, the rotational speed thereof is adjusted on the basis of control signals. In its control section, the rotational speed of the motor may be controlled on the basis of data on the temperature of the inside of the kneading chamber, the data being transmitted from a temperature sensor. The motor may have any structure as far as the structure makes it possible to change the rotational speed at will through the control section. The motor may be configured to have, for example, an inverter motor.

More specifically, a PID operation processing section located in the control section makes a PID control about the rotational speed of the motor on the basis of making proportional (P), integral (I) and differential (D) operations from a deviation between an actually measured temperature Tp of the inside of the kneading chamber, this temperature being detected through the temperature sensor, and a target temperature Ts. In other words, the PID operation processing section determines the rotational speed of the motor in accordance with proportional (P) operation for calculating out a control quantity in proportion with the difference (deviation "e") between the actually measured temperature Tp of the inside of the kneading chamber, this temperature being detected through the temperature sensor, and the target temperature Ts, integral (I) operation for calculating out a control quantity in accordance with an integral value obtained by integrating the deviation "e" in a time-axial direction, and differential (D) operation for calculating out a control quantity in accordance with the inclination of a change in the deviation "e", i.e., the differential value.

In the rubber composition production method according to the present invention, a blending agent other than any vulcanization-related blending agent is preferably blended/dispersed into the system in the step (I). Examples of the blending agent other than any vulcanization-related blending agent include silica, a silane coupling agent, an antiaging agent, zinc oxide, stearic acid, softening agents such as wax and oil, a processing aid, a metal salt of any organic acid, and a methylene receptor and a methylene donor.

Examples of the metal salt of any organic acid include cobalt naphthenate, cobalt stearate, cobalt borate, cobalt oleate, cobalt maleate, and cobalt borate trineodacanoate.

The methylene receptor may be any phenolic compound, and any phenolic resin obtained by condensing a phenolic compound with formaldehyde. Examples of the phenolic compound include phenol, resorcin, and alkyl derivatives of these compounds. Examples of the alkyl derivatives include methyl-group-attached derivatives such as cresol and xylenol, and long-chain-alkyl-attached derivatives such as nonylphenol and octylphenol. The phenolic compound may be a phenolic compound containing an acyl group such as an acetyl group.

Examples of the phenolic resin, which is obtained by condensing a phenolic compound with formaldehyde, include resorcin-formaldehyde resins, phenolic resins (phenol-formaldehyde resins), cresol resins (cresol-formaldehyde resins), and formaldehyde resins each made from plural phenolic compounds. These resins are each used in the state of being uncured to be in a liquid form or have thermal fluidity.

Out of these examples, resorcin or any resorcin derivative is preferred, and resorcin or resorcin-alkylphenol-formalin resin is particularly preferred, as the methylene receptor, from the viewpoint of the compatibility of this compound or resin with the rubber component or other components, the compactness of a resin obtained after the rubber composition is cured, and the reliability thereof.

The methylene donor may be hexamethylenetetramine, or a melamine resin. Examples of the melamine resin include methylolmelamine, a partially etherized product of methylolmelamine, and a condensate made from melamine, formaldehyde and methanol. Out of these examples, hexamethoxymethylmelamine is particularly preferred.

In the rubber composition production method of the present invention, it is preferred in the step (III) to blend/disperse, into the system, a vulcanization-related blending agent, such as a vulcanization promoter, together with sulfur. According to the invention, in the step (I), at least the rubber wet masterbatch and the antiaging agent are kneaded to be mixed with each other, and subsequently the resultant mixture, which contains at least the rubber wet masterbatch and the antiaging agent, is discharged from the internal mixer, so that the mixture is cooled. By the cooling, the initial temperature of the rubber composition in the step (III) can be made low so that the rubber composition can be prevented from suffering from scorch. The vulcanization-related blending agent other than sulfur is, for example, a vulcanizer such as an organic peroxide, a vulcanization promoter, a vulcanization promotion aid, or a vulcanization retardant.

The vulcanization promoter may be a vulcanization promoter usable ordinarily for rubber-vulcanization. Examples thereof include sulfenamide type, thiuram type, thiazole type, thiourea type, guanidine type, and dithiocarbamic acid salt type vulcanization promoters. These may be used singly or in the form of an appropriate mixture. The blend amount of the vulcanization promoter (s) is preferably from 0.5 to 3 parts by mass for 100 parts by mass of the rubber component.

EXAMPLES

Hereinafter, this invention will be more specifically described through a description about working examples thereof.

Preparation of Each Rubber Composition:

In accordance with a blend formulation in any one of Tables 1 to 4, a rubber composition for each of Examples 1 to 20 and Comparative Examples 1 to 15 was blended. An ordinary Bunbury mixer was used to knead the resultant to prepare a rubber composition. The individual blending agents described in Tables 1 to 4 are described below (in each of Tables 1 to 4, the blend amount of each of the blending agents is represented as the number of parts by mass for 100 parts by mass of the corresponding rubber component). In each of Tables 1 to 4, "rpm" about mixing conditions represents the rotational speed of stirring rotors of an internal mixer, and the kneading period (the number of seconds) is represented using "s". In each of Examples 4 to 5 and 15 to 16, the steps (II) and (III) were continuously performed without changing the rotational speed, and a kneading period described thereabout represents the total period of the steps (II) and (III).

Used Materials:

a) Carbon blacks (CBs)
   Carbon black "N220": "SEAST 6" (manufactured by Tokai Carbon Co., Ltd.) ($N_2SA$: 111 $m^2/g$)
   Carbon black "N234: "SHOWA BLACK N234" (manufactured by Cabot Japan K.K.) (N2SA: 123 $m^2/g$);
   Carbon black "N339": "SEAST KH" (manufactured by Tokai Carbon Co., Ltd.) ($N_2SA$: 93 $m^2/g$)
   Carbon black "N550": "SEAST SO" (manufactured by Tokai Carbon Co., Ltd.) ($N_2SA$: 42 $m^2/g$)
b) Dispersing solvent: Water
c) Rubber latex solutions:
   Natural rubber concentrated latex solution, manufactured by Regitex Co., Ltd. (latex solution obtained by adjusting a latex having a DRC (dry rubber content) of 60% to give a rubber concentration of 25% by mass; mass-average molecular weight Mw=236,000)
   Natural rubber latex solution (NR field latex), manufactured by a company, Golden Hope (latex solution obtained by adjusting a latex having a DRC of 31.2% to give a rubber concentration of 25% by mass; mass-average molecular weight Mw=232,000)
d) Solidifier: Formic acid (solution obtained by diluting a first-class 85% solution thereof into a 10% solution to adjust the pH of the diluted solution to 1.2), manufactured by Nacalai Tesque, Inc.
e) Oil: "PROCESS OIL", manufactured by Japan Energy Corp.
f) Antiaging agent: N-phenyl-N'-(1,3-dimethylbutyl)-p-phenylenediamine "6PPD", manufactured by the company Monsanto
g) Zinc flower: Zinc flower No. 1, manufactured by Mitsui Mining & Smelting Co., Ltd.
h) Stearic acid, manufactured by NOF Corp.
i) Sulfur, manufactured by Tsurumi Chemical Industry Co., Ltd.
j) Vulcanization promoter: "SOXINOL CZ" manufactured by Sumitomo Chemical Co., Ltd.
k) Hydrazide compounds:
   (A) Hydrazide salicylate, manufactured by Otsuka Chemical Co., Ltd.
   (B) Hydrazide 4-methylbenzoate, manufactured by Japan Finechem Inc.
   (C) Dihydrazide isophthalate, manufactured by Japan Finechem Inc.
   (E) Dihydrazide adipate, manufactured by Japan Finechem Inc.
1) Natural rubber: RSS No. 3

Example 1

To a diluted latex solution in water, the concentration thereof being adjusted to 0.5% by mass, were added 50 parts by mass of the carbon black "N234", and then a ROBOMIX manufactured by PRIMIX Corp. was used to disperse the carbon black therein (conditions of the ROMOMIX: 9000 rpm; dispersing period: 35 minutes). In this way, a carbon-black-containing slurry solution was produced in which natural rubber latex particles adhered to the carbon black (step (α-(a))).

Next, the rest of the natural rubber latex solution (to which water was added to adjust the solid (rubber) concentration therein to 25% by mass) was added to the carbon-black-containing slurry solution produced in the step (α-(a)) to set the solid (rubber) content to 100 parts by mass in the total of the rest and the carbon-black-containing slurry solution. Next, a mixer, for household use, manufactured by SANYO Electric Co., Ltd. (mixer condition: 11300 rpm for 30 minutes) was used to produce a carbon-black-containing natural rubber latex solution in which natural rubber latex particles adhered to the carbon black (step (β-(a))).

A 10% by mass solution of formic acid in water was added as a solidifier to the carbon-black-containing natural rubber latex solution produced in the step (β-(a)), in which the natural rubber latex particles adhered to the carbon black, until the pH of the resultant turned to 4. Thus, the carbon-black-containing natural rubber latex solution, in which the natural rubber latex particles adhered to the carbon black, was solidified in the state of being heated to 90° C. (step (III)).

A punching metal, 2.0 in diameter and 3.5 P, made of SUS was used to subject the solution to filtrating separation to separate the solidified product from the solution. The product was dried through a squeezer-type monoaxial extrusion-dehydrating machine (V-02 model) manufactured by Suehiro EPM Corp. to produce a natural rubber wet masterbatch (NR-WMB (N234)) (step (III)). In the item "NR-WMB (N234)" described in Table 1, "(N234)" shows the used carbon black species. In the item "NR-WMB (N234/N550)" described in Table 2, "(N234/N550)" shows that two carbon black species of N234 and N550 were together used.

A Bunbury mixer (manufactured by Kobe Steel, Ltd.) was used to blend various additives shown in Table 1 into the resultant natural rubber wet masterbatch to prepare a rubber composition. Physical properties of a vulcanized rubber obtained therefrom were measured. In the performed step (I), the natural rubber wet masterbatch obtained as described above, the oil, the antiaging agent, zinc flower and stearic acid were blended with each other in respective blend amounts shown in Table 1 (kneading period: 30 seconds; rotational speed of stirring rotors of the internal mixer: 50 rpm). The step (II) of fracturing re-aggregates of the carbon black was then performed (kneading period: 15 seconds; rotational speed of the stirring rotors of the internal mixer: 40 rpm). Thereafter, into the resultant were blended sulfur, the vulcanization promoter, and dihydrazide isophthalate in respective blend amounts shown in Table 1 (kneading period: 45 seconds; rotational speed of the stirring rotors of the internal mixer: 20 rpm) in the step (III).

Examples 2 to 20, and Comparative Examples 1 to 15

In each of the examples, a rubber composition was produced in the same way as in Example 1 except that the individual blending agent species and the timing of the blending were changed.

Evaluations:

Evaluations were made about a rubber obtained by using a predetermined mold to heat and vulcanize each of the rubber compositions at 150° C. for 30 minutes.

Low Exothermic Performance:

According to JIS K6265, the low exothermic performance of each of the produced vulcanized rubbers was evaluated through the loss tangent tan δ thereof. A rheospectrometer, E4000, manufactured by a company, UBM, was used to measure the loss tangent at 50 Hz and 80° C. under a condition of a dynamic strain of 2%. In the evaluation, the value of Comparative Example 2 was regarded as 100, and Examples 1 to 11, and Comparative Examples 1, and 3 to 7 were each evaluated through an index relative thereto; the value of Comparative Example 9 was regarded as 100, and Examples 12 to 16, and Comparative Examples 8, and 10 to 12 were each evaluated through an index relative thereto; the value of Comparative Example 13 was regarded as 100, and Example 17 was evaluated through an index relative thereto; the value of Comparative Example 14 was regarded as 100, and Examples 18 and 19 were each evaluated through an index relative thereto; and further the value of Comparative Example 15 was regarded as 100, and Example 20 was evaluated through an index relative thereto. It is denoted that as the numerical value is lower, the low exothermic performance is better. The results are shown, in Tables 1 to 4.

Tear-Resistant Performance:

According to JIS K6265, the tear-resistant performance of each of the produced vulcanized rubbers was evaluated. In the evaluation, the value of Comparative Example 2 was regarded as 100, and Examples 1 to 11, and Comparative Examples 1, and 3 to 7 were each evaluated through an index relative thereto; the value of Comparative Example 9 was regarded as 100, and Examples 12 to 16, and Comparative Examples 8, and 10 to 12 were each evaluated through an index relative thereto; the value of Comparative Example 13 was regarded as 100, and Example 17 was evaluated through an index relative thereto; the value of Comparative Example 14 was regarded as 100, and Examples 18 to 19 were each evaluated through an index relative thereto; and further the value of Comparative Example 15 was regarded as 100, and Example 20 was evaluated through an index relative thereto. If is denoted that as the numerical value is higher, the tear-resistant performance is better. The results are shown in Tables 1 to 4.

TABLE 1

| | | Comparative Example 1 | Comparative Example 2 | Comparative Example 3 | Comparative Example 4 | Comparative Example 5 | Comparative Example 6 |
|---|---|---|---|---|---|---|---|
| Step (I) | Natural rubber | 100 | — | 100 | 100 | 100 | 100 |
| | CB"N234" | 50 | — | 50 | 50 | 50 | 50 |
| | NR-WMB (N234)*A | — | 150 | — | — | — | — |
| | Oil | 2 | 2 | 2 | 2 | 2 | 2 |
| | Antiaging agent | 2 | 2 | 2 | 2 | 2 | 2 |
| | Zinc flower | 3 | 3 | 3 | 3 | 3 | 3 |
| | Stearic acid | 2 | 2 | 2 | 2 | 2 | 2 |
| | Dihydrazide isophthalate | — | — | — | — | — | — |
| | Mixing conditions | 50 rpm/ 30 s | 50 rpm/ 30 s | 50 rpm/ 30 s | 50 rpm/ 30 s | 50 rpm/ 30 s | 50 rpm/ 30 s |
| Step (II) | Mixing conditions | 40 rpm/ 15 s | 40 rpm/ 15 s | 40 rpm/ 15 s | 40 rpm/ 15 s | 40 rpm/ 15 s | 40 rpm/ 15 s |
| Step (III) | Sulfur | 1.5 | 1.5 | 1.5 | 1.5 | 1.5 | 1.5 |
| | vulcanization promoter | 1.5 | 1.5 | 1.5 | 1.5 | 1.5 | 1.5 |
| | Hydrazide salicylate | — | — | 0.7 | 0.7 | — | — |
| | Hydrazide 4-methylbenzoate | — | — | — | — | — | — |
| | Dihydrazide isophthalate | — | — | — | — | 0.7 | 0.7 |
| | Dihydrazide adipate | — | — | — | — | — | — |
| | Mixing conditions | 15 rpm/ 60 s | 15 rpm/ 60 s | 15 rpm/ 45 s | *3 | 15 rpm/ 45 s | *3 |
| | Vulcanized rubber physical properties | | | | | | |
| | Low exothermic performance (tanδ) | 105 | 100 | 103 | 102 | 103 | 103 |
| | Tear-resistant performance | 97 | 100 | 95 | 96 | 90 | 95 |

| | | Example 1 | Example 2 | Example 3 | Example 4 | Example 5 |
|---|---|---|---|---|---|---|
| Step (I) | Natural rubber | — | — | — | — | — |
| | CB"N234" | — | — | — | — | — |
| | NR-WMB (N234)*A | 150 | 150 | 150 | 150 | 150 |
| | Oil | 2 | 2 | 2 | 2 | 2 |
| | Antiaging agent | 2 | 2 | 2 | 2 | 2 |

TABLE 1-continued

|  |  |  |  |  |  |  |
|---|---|---|---|---|---|---|
|  | Zinc flower | 3 | 3 | 3 | 3 | 3 |
|  | Stearic acid | 2 | 2 | 2 | 2 | 2 |
|  | Dihydrazide isophthalate | — | — | — | — | — |
|  | Mixing conditions | 50 rpm/ 30 s | 50 rpm/ 30 s | 50 rpm/ 30 s | 50 rpm/ 30 s | 50 rpm/ 30 s |
| Step (II) | Mixing conditions | 40 rpm/ 15 s | 40 rpm/ 15 s | 40 rpm/ 15 s | *1 | *2 |
| Step (III) | Sulfur | 1.5 | 1.5 | 1.5 | 1.5 | 1.5 |
|  | vulcanization promoter | 1.5 | 1.5 | 1.5 | 1.5 | 1.5 |
|  | Hydrazide salicylate | — | — | — | — | — |
|  | Hydrazide 4-methylbenzoate | — | — | — | — | — |
|  | Dihydrazide isophthalate | 0.7 | 0.7 | 0.7 | 0.7 | 0.7 |
|  | Dihydrazide adipate | — | — | — | — | — |
|  | Mixing conditions | 20 rpm/ 45 s | 15 rpm/ 60 s | *3 | *1 | *2 |
| Vulcanized rubber physical properties |  |  |  |  |  |  |
| Low exothermic performance (tanδ) |  | 92 | 90 | 90 | 95 | 96 |
| Tear-resistant performance |  | 103 | 104 | 105 | 102 | 103 |

*1: Steps (II) and (III) continuously performed at 40 rpm for 60 seconds totally.
*2: Steps (II) and (III) continuously performed at 20 rpm for 60 seconds totally.
*3: PID control was made to knead the components at a control temperature of 110° C. for 45 seconds. Rotational speed of stirring rotors at PID control time: 17 to 23 rpm
*A Amount of N234 in NR-WMB: 50 parts by mass for 100 parts by mass of rubber component

TABLE 2

|  |  | Comparative Example 1 | Comparative Example 7 | Example 6 | Example 7 | Example 8 | Example 9 | Example 10 | Example 11 |
|---|---|---|---|---|---|---|---|---|---|
| Step (I) | Natural rubber | 100 | — | — | — | — | — | — | — |
|  | CB"N234" | 50 | — | — | — | — | — | — | — |
|  | NR-WMB (N234)*A | — | 150 | 150 | 150 | 150 | 150 | 150 | 150 |
|  | Oil | 2 | 2 | 2 | 2 | 2 | 2 | 2 | 2 |
|  | Antiaging agent | 2 | 2 | 2 | 2 | 2 | 2 | 2 | 2 |
|  | Zinc flower | 3 | 3 | 3 | 3 | 3 | 3 | 3 | 3 |
|  | Stearic acid | 2 | 2 | 2 | 2 | 2 | 2 | 2 | 2 |
|  | Dihydrazide isophthalate | — | 0.7 | — | — | — | — | — | — |
|  | Mixing conditions | 50 rpm/ 30 s | 50 rpm/ 30 s | 50 rpm/ 30 s | 50 rpm/ 30 s | 50 rpm/ 30 s | 50 rpm/ 30 s | 50 rpm/ 30 s | 50 rpm/ 30 s |
| Step (II) | Mixing conditions | 40 rpm/ 15 s | 40 rpm/ 15 s | 40 rpm/ 15 s | 40 rpm/ 15 s | 40 rpm/ 15 s | 40 rpm/ 15 s | 40 rpm/ 5 s | 40 rpm/ 15 s |
| Step (III) | Sulfur | 1.5 | 1.5 | 1.5 | 1.5 | 1.5 | 1.5 | 1.5 | 1.5 |
|  | vulcanization promoter | 1.5 | 1.5 | 1.5 | 1.5 | 1.5 | 1.5 | 1.5 | 1.5 |
|  | Hydrazide salicylate | — | — | — | — | — | — | — | — |
|  | Hydrazide 4-methylbenzoate | — | — | 3 | — | — | — | — | — |
|  | Dihydrazide isophthalate | — | — | — | 1 | 2 | — | 0.7 | 0.7 |
|  | Dihydrazide adipate | — | — | — | — | — | 1 | — | — |
|  | Mixing conditions | 15 rpm/ 60 s | 20 rpm/ 45 s | 20 rpm/ 45 s | 20 rpm/ 45 s | 20 rpm/ 45 s | 15 rpm/ 60 s | 20 rpm/ 55 s | 20 rpm/ 30 s |
| Vulcanized rubber physical properties |  |  |  |  |  |  |  |  |  |
| Low exothermic performance (tanδ) |  | 105 | 97 | 90 | 90 | 88 | 94 | 97 | 98 |
| Tear-resistant performance |  | 97 | 90 | 104 | 107 | 109 | 108 | 104 | 102 |

*A Amount of N234 in NR-WMB: 50 parts by mass for 100 parts by mass of rubber component

TABLE 3

|  |  | Comparative Example 8 | Comparative Example 9 | Comparative Example 10 | Comparative Example 11 | Example 12 |
|---|---|---|---|---|---|---|
| Step (I) | Natural rubber | 100 | — | 100 | 100 | — |
|  | CB"N234" | 25 | — | 25 | 25 | — |
|  | CB"N220" | — | — | — | — | — |
|  | CB"N339" | — | — | — | — | — |
|  | CB"N550" | 25 | — | 25 | 25 | — |
|  | NR-WMB (N234/N550)*A | — | 150 | — | — | 150 |
|  | NR-WMB (N234/N220)*B | — | — | — | — | — |
|  | NR-WMB (N234/N339)*C | — | — | — | — | — |

TABLE 3-continued

|  |  | | | | | |
|---|---|---|---|---|---|---|
|  | NR-WMB (N339/N550)*D | — | — | — | — | — |
|  | Oil | 2 | 2 | 2 | 2 | 2 |
|  | Antiaging agent | 2 | 2 | 2 | 2 | 2 |
|  | Zinc flower | 3 | 3 | 3 | 3 | 3 |
|  | Stearic acid | 2 | 2 | 2 | 2 | 2 |
|  | Dihydrazide isophthalate | — | — | — | — | — |
|  | Mixing conditions | 50 rpm/30 s | 50 rpm/30 s | 50 rpm/30 s | 50 rpm/30 s | 50 rpm/30 s |
| Step (II) | Mixing conditions | 40 rpm/15 s | 40 rpm/15 s | 40 rpm/15 s | 40 rpm/15 s | 40 rpm/15 s |
| Step (III) | Sulfur | 1.5 | 1.5 | 1.5 | 1.5 | 1.5 |
|  | vulcanization promoter | 1.5 | 1.5 | 1.5 | 1.5 | 1.5 |
|  | Hydrazide salicylate | — | — | — | — | — |
|  | Hydrazide 4-methylbenzoate | — | — | — | — | — |
|  | Dihydrazide isophthalate | — | — | 0.7 | 2 | 0.7 |
|  | Dihydrazide adipate | — | — | — | — | — |
|  | Mixing conditions | 15 rpm/60 s | 15 rpm/60 s | 15 rpm/60 s | *3 | *3 |
| Vulcanized rubber physical properties | | | | | | |
|  | Low exothermic performance (tanδ) | 103 | 100 | 100 | 99 | 85 |
|  | Tear-resistant performance | 95 | 100 | 94 | 92 | 110 |

|  |  | Example 13 | Example 14 | Example 15 | Example 16 | Comparative Example 12 |
|---|---|---|---|---|---|---|
| Step (I) | Natural rubber | — | — | — | — | — |
|  | CB"N234" | — | — | — | — | — |
|  | CB"N220" | — | — | — | — | — |
|  | CB"N339" | — | — | — | — | — |
|  | CB"N550" | — | — | — | — | — |
|  | NR-WMB (N234/N550)*A | 150 | 150 | 150 | 150 | 150 |
|  | NR-WMB (N234/N220)*B | — | — | — | — | — |
|  | NR-WMB (N234/N339)*C | — | — | — | — | — |
|  | NR-WMB (N339/N550)*D | — | — | — | — | — |
|  | Oil | 2 | 2 | 2 | 2 | 2 |
|  | Antiaging agent | 2 | 2 | 2 | 2 | 2 |
|  | Zinc flower | 3 | 3 | 3 | 3 | 3 |
|  | Stearic acid | 2 | 2 | 2 | 2 | 2 |
|  | Dihydrazide isophthalate | — | — | — | — | 0.7 |
|  | Mixing conditions | 50 rpm/30 s | 50 rpm/30 s | 50 rpm/30 s | 50 rpm/30 s | 50 rpm/30 s |
| Step (II) | Mixing conditions | 40 rpm/15 s | 40 rpm/15 s | *1 | *2 | 40 rpm/15 s |
| Step (III) | Sulfur | 1.5 | 1.5 | 1.5 | 1.5 | 1.5 |
|  | vulcanization promoter | 1.5 | 1.5 | 1.5 | 1.5 | 1.5 |
|  | Hydrazide salicylate | — | — | — | — | — |
|  | Hydrazide 4-methylbenzoate | — | 2 | — | — | — |
|  | Dihydrazide isophthalate | 0.3 | — | 0.7 | 2 | — |
|  | Dihydrazide adipate | — | — | — | — | — |
|  | Mixing conditions | 20 rpm/45 s | 20 rpm/45 s | *1 | *2 | 20 rpm/45 s |
| Vulcanized rubber physical properties | | | | | | |
|  | Low exothermic performance (tanδ) | 90 | 80 | 96 | 95 | 97 |
|  | Tear-resistant performance | 108 | 114 | 102 | 103 | 90 |

*1: Steps (II) and (III) continuously performed at 40 rpm for 60 seconds totally.
*2: Steps (II) and (III) continuously performed at 20 rpm for 60 seconds totally.
*3: PID control was made to knead the components at a control temperature of 110° C. for 45 seconds. Rotational speed of stirring rotors at PID control time: 17 to 23 rpm
*A Respective amounts of N234 and N550 in NR-WMB: 25 parts and 25 parts by mass for 100 parts by mass of rubber component
*B Respective amounts of N234 and N220 in NR-WMB: 25 parts and 25 parts by mass for 100 parts by mass of rubber component
*C Respective amounts of N234 and N339 in NR-WMB: 25 parts and 25 parts by mass of 100 parts by mass of rubber component
*D Respective amounts of N339 and N550 in NR-WMB: 35 parts and 15 parts by mass for 100 parts by mass of rubber component

TABLE 4

|  |  | Comparative Example 13 | Example 17 | Comparative Example 14 | Example 18 | Example 19 | Comparative Example 15 | Example 20 |
|---|---|---|---|---|---|---|---|---|
| Step (I) | Natural rubber | — | — | — | — | — | — | — |
|  | CB"N234" | — | — | — | — | — | — | — |
|  | CB"N220" | — | — | — | — | — | — | — |
|  | CB"N339" | — | — | — | — | — | — | — |
|  | CB"N550" | — | — | — | — | — | — | — |
|  | NR-WMB(N234/N550)*A | — | — | — | — | — | — | — |

TABLE 4-continued

| | | Comparative Example 13 | Example 17 | Comparative Example 14 | Example 18 | Example 19 | Comparative Example 15 | Example 20 |
|---|---|---|---|---|---|---|---|---|
| | NR-WMB(N234/N220)*B | 150 | 150 | — | — | — | — | — |
| | NR-WMB(N234/N339)*C | — | — | 150 | 150 | 150 | — | — |
| | NR-WMB(N339/N550)*D | — | — | — | — | — | 150 | 150 |
| | Oil | 2 | 2 | 2 | 2 | 2 | 2 | 2 |
| | Antiaging agent | 2 | 2 | 2 | 2 | 2 | 2 | 2 |
| | Zinc flower | 3 | 3 | 3 | 3 | 3 | 3 | 3 |
| | Stearic acid | 2 | 2 | 2 | 2 | 2 | 2 | 2 |
| | Dihydrazide isophthalate | — | — | — | — | — | — | — |
| | Mixing conditions | 50 rpm/ 30 s | 50 rpm/ 30 s | 50 rpm/ 30 s | 50 rpm/ 30 s | 50 rpm/ 30 s | 50 rpm/ 30 s | 50 rpm/ 30 s |
| Step (II) | Mixing conditions | 40 rpm/ 15 s | 40 rpm/ 15 s | 40 rpm/ 15 s | 40 rpm/ 15 s | 40 rpm/ 15 s | 40 rpm/ 15 s | 40 rpm/ 15 s |
| Step (III) | Sulfur | 1.5 | 1.5 | 1.5 | 1.5 | 1.5 | 1.5 | 1.5 |
| | vulcanization promoter | 1.5 | 1.5 | 1.5 | 1.5 | 1.5 | 1.5 | 1.5 |
| | Hydrazide salicylate | — | — | — | — | — | — | — |
| | Hydrazide 4-methylbenzoate | — | — | — | — | — | — | — |
| | Dihydrazide isophthalate | — | 0.7 | — | 0.7 | 0.7 | — | 0.7 |
| | Dihydrazide adipate | — | — | — | — | — | — | — |
| | Mixing conditions | 20 rpm/ 45 s | 20 rpm/ 45 s | 20 rpm/ 45 s | 20 rpm/ 45 s | *3 | 20 rpm/ 45 s | 20 rpm/ 45 s |
| Vulcanized rubber physical properties | | | | | | | | |
| | Low exothermic performance (tanδ) | 100 | 91 | 100 | 81 | 80 | 100 | 83 |
| | Tear-resistant performance | 100 | 106 | 100 | 110 | 117 | 100 | 115 |

*3: PID control was made to knead the components at a control temperature of 110° C. for 45 seconds. Rotational speed of stirring rotors at PID control time: 17 to 23 rpm
*A Respective amounts of N234 and N550 in NR-WMB: 25 parts and 25 parts by mass for 100 parts by mass of rubber component
*B Respective amounts of N234 and N220 in NR-WMB: 25 parts and 25 parts by mass for 100 parts by mass of rubber component
*C Respective amounts of N234 and N339 in NR-WMB: 25 parts and 25 parts by mass for 100 parts by mass of rubber component
*D Respective amounts of N339 and N550 in NR-WMB: 35 parts and 15 parts by mass for 100 parts by mass of rubber component From the results in Tables 1 to 4, it is understood that the vulcanized rubber of the rubber composition produced by the production method of each of the working examples is excellent in tear-resistant performance and low exothermic performance.

The invention claimed is:

1. A production method for a rubber composition, comprising: using an internal mixer to mix/disperse a rubber wet masterbatch containing a carbon black, a hydrazide compound, an antiaging agent, and sulfur,
    wherein a timing when the hydrazide compound is charged into the internal mixer is not the same timing when the antiaging agent is charged thereinto but the same timing when the component sulfur is charged thereinto.

2. The production method for a rubber composition according to claim 1, wherein the rubber wet masterbatch is obtained through a step (α) of using, as raw materials, at least the carbon black, a dispersing solvent, and a rubber latex solution to disperse at least the carbon black into the dispersing solvent to produce a carbon-black-containing slurry solution, a step (β) of mixing the carbon-black-containing slurry solution with the rubber latex solution to produce a carbon-black-containing rubber latex solution, and a step (γ) of solidifying/drying the carbon-black-containing rubber latex solution; and
    the step (α) is a step (α-(a)) in which when the carbon black is dispersed into the dispersing solvent, at least one portion of the rubber latex solution is added thereto, thereby producing a slurry solution containing the carbon black to which rubber latex particles adhere, and
    the step (β) is a step (β-(a)) of mixing the slurry solution containing the carbon black, to which the rubber latex particles adhere, with the rest of the rubber latex solution to produce a rubber latex solution containing the carbon black to which rubber latex particles adhere.

3. The production method for a rubber composition according to claim 1, comprising:
    a step (I) of kneading at least the rubber wet masterbatch and the antiaging agent to be mixed with each other, and subsequently discharging the resultant mixture, which contains the rubber wet masterbatch and the antiaging agent, from the internal mixer,
    a step (II) of kneading the mixture again in the internal mixer to fracture a re-aggregate of the carbon black in the mixture, and
    a step (III) of charging, after the step (II), the hydrazide compound and the component sulfur simultaneously into the internal mixer to knead the mixture, the hydrazide compound and the component sulfur, thereby mixing these materials with each other.

4. The production method for a rubber composition according to claim 3, wherein in the step (II), the period for the kneading is at least 15 seconds or more, and a stirring rotor of the internal mixer shows a rotational speed of 35 rpm or more; and
    in the step (III), the period for the kneading is at least 40 seconds or more, and the stirring rotor of the internal mixer shows a rotational speed of 15 to 25 rpm or more.

* * * * *